No. 844,407. PATENTED FEB. 19, 1907.
J. A. RUSSELL.
CLUTCH.
APPLICATION FILED AUG. 17, 1905.
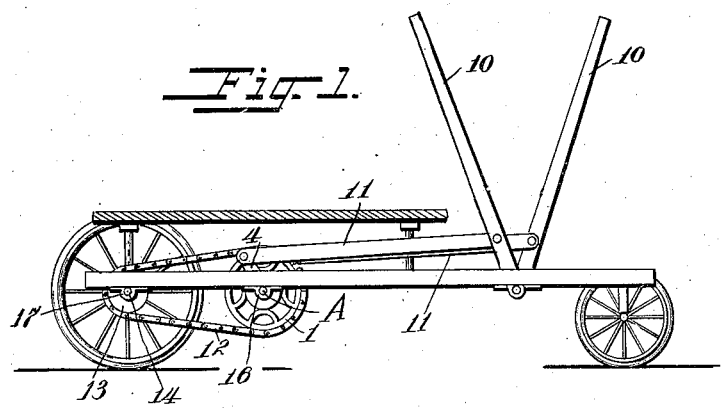
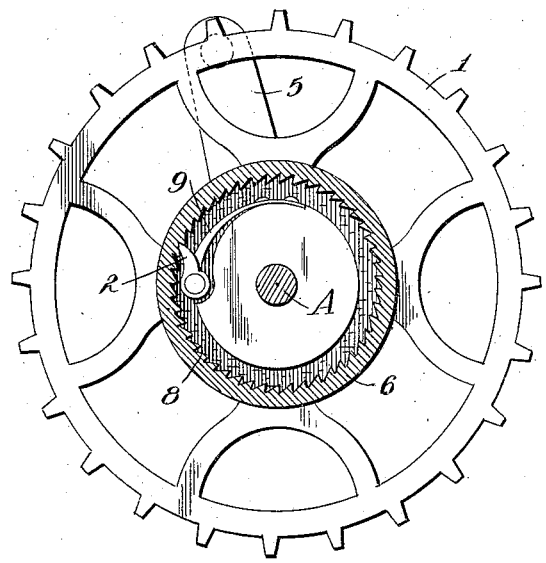
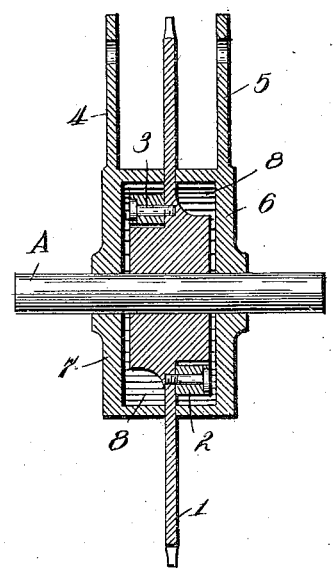
Witnesses
Milton Lenoir
Vernon E. Hodges
Inventor
John A. Russell
by Jacob H. Snow
his Attorney

UNITED STATES PATENT OFFICE.

JOHN A. RUSSELL, OF INDIANAPOLIS, INDIANA, ASSIGNOR OF ONE-THIRD TO ISAAC O. RUSSELL AND ONE-THIRD TO JOHN F. MESSICK, OF INDIANAPOLIS, INDIANA.

CLUTCH.

No. 844,407.      Specification of Letters Patent.      Patented Feb. 19, 1907.

Application filed August 17, 1905. Serial No. 274,560.

*To all whom it may concern:*

Be it known that I, JOHN A. RUSSELL, a citizen of the United States, residing at Indianapolis, in the county of Marion and State of Indiana, have invented certain new and useful Improvements in Clutches, of which the following is a specification.

My invention relates to an improvement in clutches; and it is adapted especially for use on little wagons for children and for like small vehicles.

With the foregoing in view this invention consists in an axle having a gear-wheel rigidly mounted thereon or integral therewith for transmitting power to the axle of the vehicle, in connection with actuating-levers operatively mounted on the axle and provided with internal ratchet-teeth adapted to engage spring-actuated pawls pivoted at the hub of the gear-wheel, whereby to engage and communicate motion to the gear-wheel when moved in one direction and turn idly thereon when swung in the opposite direction to take a new hold.

The invention further consists in certain novel features of construction and combinations of parts, which will be hereinafter described, and pointed out in the claim.

In the accompanying drawings, Figure 1 is a longitudinal section through a wagon, showing the clutch applied thereto in side elevation. Fig. 2 is an enlarged view of the gear or sprocket wheel, showing a portion of the clutch in longitudinal section; and Fig. 3 is a transverse section.

A represents the axle, and 1 is preferably a sprocket-wheel, either rigidly secured thereon or integral therewith. At the hub the pawls 2 and 3 are pivoted, one on each side of the sprocket-wheel, as shown in Fig. 3.

Operating-levers 4 and 5 are loosely mounted on the axle A on each side of the sprocket-wheel, and these levers are each provided with internally-ratchet-toothed hubs 6 and 7, respectively, the teeth 8 of which are engaged by the pawls 2 and 3, in which engagement they are held yieldingly by the springs 9, one of which is shown in Fig. 2. These operating-levers may be actuated in any convenient manner, directly or indirectly, as shown in the drawings, by means of the hand-levers 10 10 and links 11 11, and they may be moved in unison or alternately forward and backward, as indicated in Fig. 1. With each backward movement of a hand-lever its connected operating-lever moves forward, clutching the sprocket-wheel through the medium of the teeth 8, operating upon one of the pawls 2 or 3. With each forward movement these teeth and pawls ride over each other freely, and as a certain speed of rotation is developed in the axle of course it turns forward freely, irrespective of the motion of the operating-levers.

The power of the sprocket-wheel 1 is transmitted through a chain 12 or equivalent means to the sprocket-wheel 13 on the rear axle 14 of the vehicle 15. Axles A and 14 are supported in hangers 16 and 17, respectively, or in other convenient manner.

Slight additional changes might, of course, be made in the form and arrangement of the several parts described other than those already mentioned, and hence I do not wish to limit myself to the exact construction herein set forth; but, Having fully described my invention, what I claim as new, and desire to secure by Letters Patent, is—

A clutch comprising a revolubly-supported power-transmitting wheel, said wheel having recesses formed therein, and pawls received in the recesses and pivoted to the wheel, and operating-levers having internally-ratchet-toothed hubs which embrace the hub of the wheel, and are engaged by the pawls whereby to communicate motion therefrom to the wheel.

In testimony whereof I affix my signature in presence of two witnesses.

JOHN A. RUSSELL.

Witnesses:
     LOUISE SIPPACH,
     ISAAC O. RUSSELL.